(12) United States Patent
Stecher (10) Patent No.: US 8,997,017 B2
(45) Date of Patent: Mar. 31, 2015

(54) CONTROLLING INTERACTIONS VIA OVERLAID WINDOWS

(75) Inventor: David M. Stecher, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 731 days.

(21) Appl. No.: 13/278,864

(22) Filed: Oct. 21, 2011

(65) Prior Publication Data

US 2013/0104065 A1 Apr. 25, 2013

(51) Int. Cl.
*G06F 3/048* (2013.01)
*G06F 3/0481* (2013.01)
*G06F 3/14* (2006.01)
*G06F 3/0484* (2013.01)

(52) U.S. Cl.
CPC .............. *G06F 3/0481* (2013.01); *G06F 3/14* (2013.01); *G06F 3/04842* (2013.01)
USPC ........... 715/790; 715/759; 715/766; 715/767; 715/768; 715/791; 715/794; 715/797

(58) Field of Classification Search
USPC .......... 715/759, 766, 767, 768, 791, 794, 797
See application file for complete search history.

(56) References Cited

U.S. PATENT DOCUMENTS

| | | | |
|---|---|---|---|
| 6,002,397 A * | 12/1999 | Jaaskelainen, Jr. | 715/805 |
| 6,252,595 B1 * | 6/2001 | Birmingham et al. | 715/803 |
| 7,343,562 B2 | 3/2008 | Bonura et al. | |
| 7,429,993 B2 | 9/2008 | Hui | |
| 7,543,242 B2 | 6/2009 | Goossen et al. | |
| 2002/0171682 A1 * | 11/2002 | Frank et al. | 345/790 |
| 2003/0142108 A1 * | 7/2003 | Brown et al. | 345/589 |
| 2003/0142138 A1 * | 7/2003 | Brown et al. | 345/797 |
| 2004/0090467 A1 * | 5/2004 | Bonura et al. | 345/790 |

OTHER PUBLICATIONS

The Chromium Projects (published Jun. 26, 2010) https://web.archive.org/web/20100626075831/http://dev.chromium.org/user-experience/keyboard-access.*
Pin and Keep Any Window Always on Top With DeskPins (Jun. 26, 2010) http://www.technorms.com/487/pin-and-keep-any-window-always-on-top-with-deskpins.*
Keyboard Shortcuts and Combination Keys (May 13, 2007) https://web.archive.org/web/20070513055425/http://www.parsonplace.com/keyboard.html.*
"Always keep a window on the screen—Tips & Tweaks", Obtained from internet on Jul. 5, 2011: http://forums.techarena.in/tips-tweaks/1307095.htm Feb. 18, 2010 , 3 pages.
"Download Window Pinner 1.0 Free—Window Pinner", Softpedia Developer: thyante Software Obtained from internet Jul. 8, 2011: http://www.softpedia.com/get/Office-tools/Other-Office-Tools/Window-Pinner.shtml 2001-2011 , 2 pages.

(Continued)

*Primary Examiner* — Alvin Tan
*Assistant Examiner* — Rinna Yi
(74) *Attorney, Agent, or Firm* — DeLizio Gilliam, PLLC (57) ABSTRACT

Some embodiments of the inventive subject matter are directed to affixing a first window to a top layer of a stack of overlaid windows in a user interface, and making one or more portions of the first window transparent. One or more portions of one or more additional windows below the first window in the stack of overlaid windows become visible through the one or more portions of the first window. Some embodiments are further directed to directing a focus for user input to the one or more additional windows below the first window while the first window remains affixed at the top layer.

13 Claims, 8 Drawing Sheets

(56) References Cited

OTHER PUBLICATIONS

"How Do I Force Window to Foreground", Obtained from Internet on Jul. 8, 2011: http://www.computing.net/answers/windows-xp/how-do-i-force-window-to-foreground/126961.html Feb. 3, 2005, 5 pages.

"How to Change Window Transparency in Windows 7 with a Hotkey", Obtained from Internet Jul. 8, 2011: http://www.howtogeek.com/howto/44915/how-to-change-window-transparency-in-windows-7/ Mar. 3, 2011, 4 pages.

Ishak, Edward W. et al., "Interacting with Hidden Content using Content-Aware Free-Space Transparency", UIST: Proceedings of the Annual ACM Symposium on User Interface Software and Technology, Association for Computing Machinery Columbia University, Department of Computer Science New York, NY 10027 2004, 3 pages.

\* cited by examiner

CONTROLLING INTERACTIONS VIA OVERLAID WINDOWS

BACKGROUND

Embodiments of the inventive subject matter generally relate to the field of user interfaces, and, more particularly, to use of windows in a user interface.

Computers are power and useful tools. Users can interact with computers via displays. The displays present a user interface (e.g., a graphical user interface, or GUI) which presents windows and other objects that respond to user input via input devices (e.g. keystrokes of a keyboard, clicks and movement of a mouse, etc.). However, sizes of user interfaces, and the objects that appear in user interfaces, are limited. For instance, a size of viewable portion of a user interface is limited a size of a display on which the user interface is displayed. To present more viewable information on a user interface, one could use a large display. Large displays, however, are more expensive and take up more space than smaller displays. Therefore, for this reason, and other reasons, software designers are continuously looking for ways to create innovative features of user interfaces that make better use of space on a user interface, enhance usability, and, in other ways, make user interfaces more interesting, useful, or marketable.

SUMMARY

Some embodiments of the inventive subject matter are directed to affixing a first window to a top layer of a stack of overlaid windows in a user interface, and making one or more portions of the first window transparent. One or more portions of one or more additional windows below the first window in the stack of overlaid windows become visible through the one or more portions of the first window. Some embodiments are further directed to directing a focus for user input to the one or more additional windows below the first window while the first window remains affixed at the top layer. For instance, the focus for the user input is directed to the one or more additional windows when a specific hotkey combination is pressed on a keyboard or when a mouse pointer is placed over the one or more transparent portions of the first window and a mouse button is clicked and held for a specific period of time. Some embodiments are further directed to controlling interaction with content on the one or more additional windows through the one or more transparent portions of the first window.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences, and computer program products that embody techniques of the present inventive subject matter. However, it is understood that the described embodiments may be practiced without these specific details. For instance, although examples refer to user interfaces of a personal computer, other instances may include user interfaces of mobile devices, smart phones, pocket computers, tablet computers, or any other type of computing device. In other instances, well-known instruction instances, protocols, structures, and techniques have not been shown in detail in order not to obfuscate the description.

Figure 1:
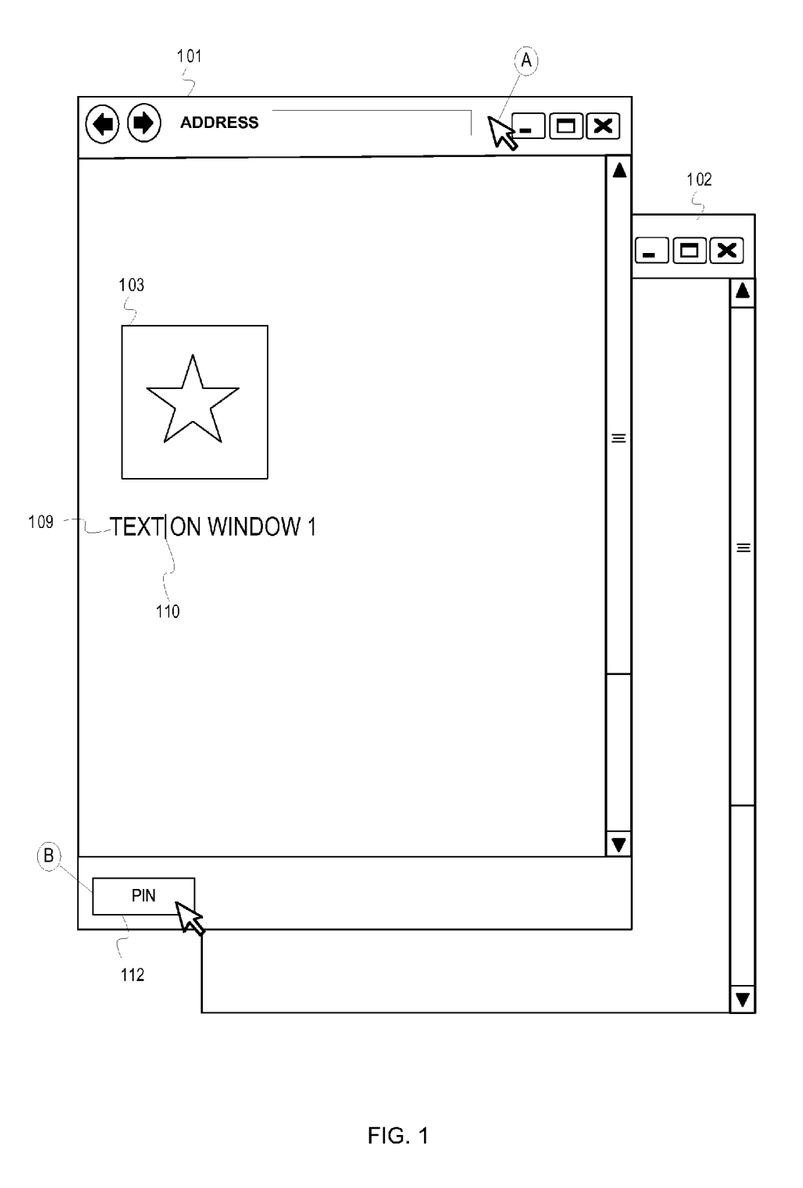
FIGS. 1-3 are example conceptual diagrams of controlling interactions via a transparent overlaid window.
Figure 2:
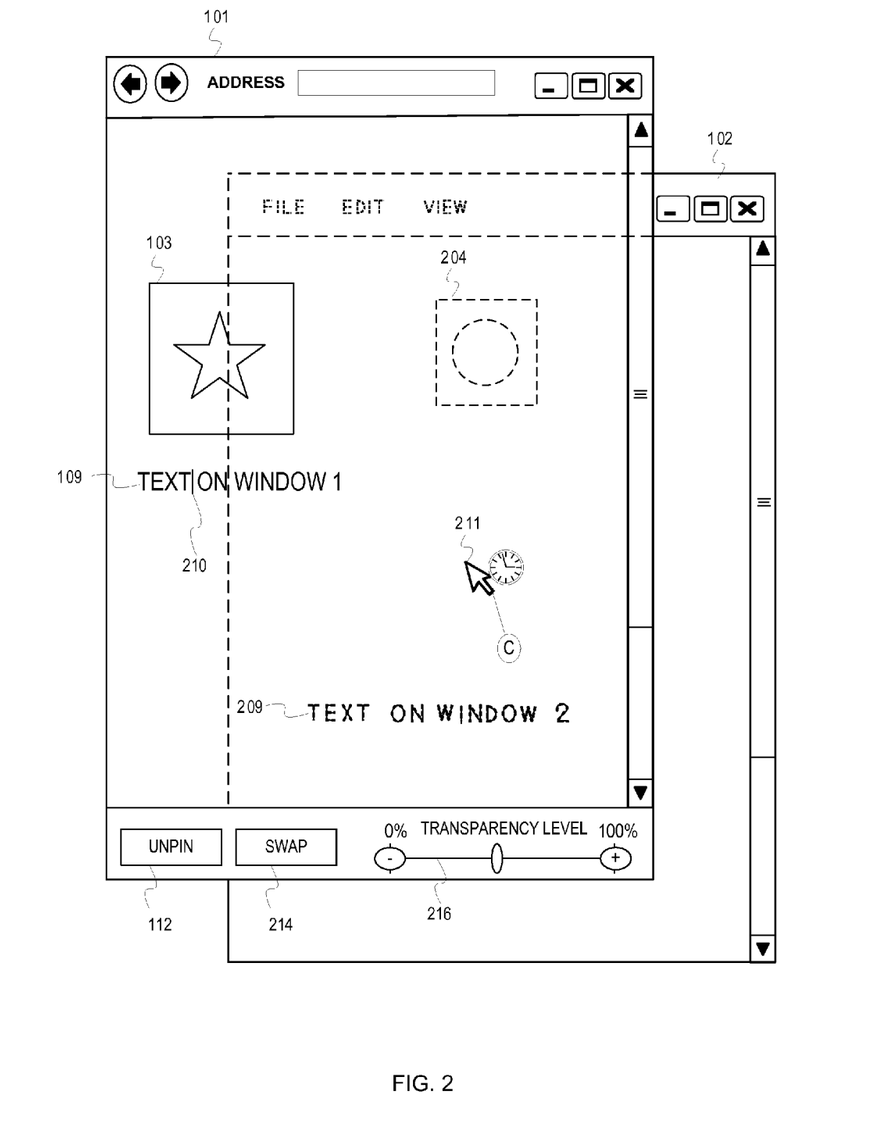
Figure 3:
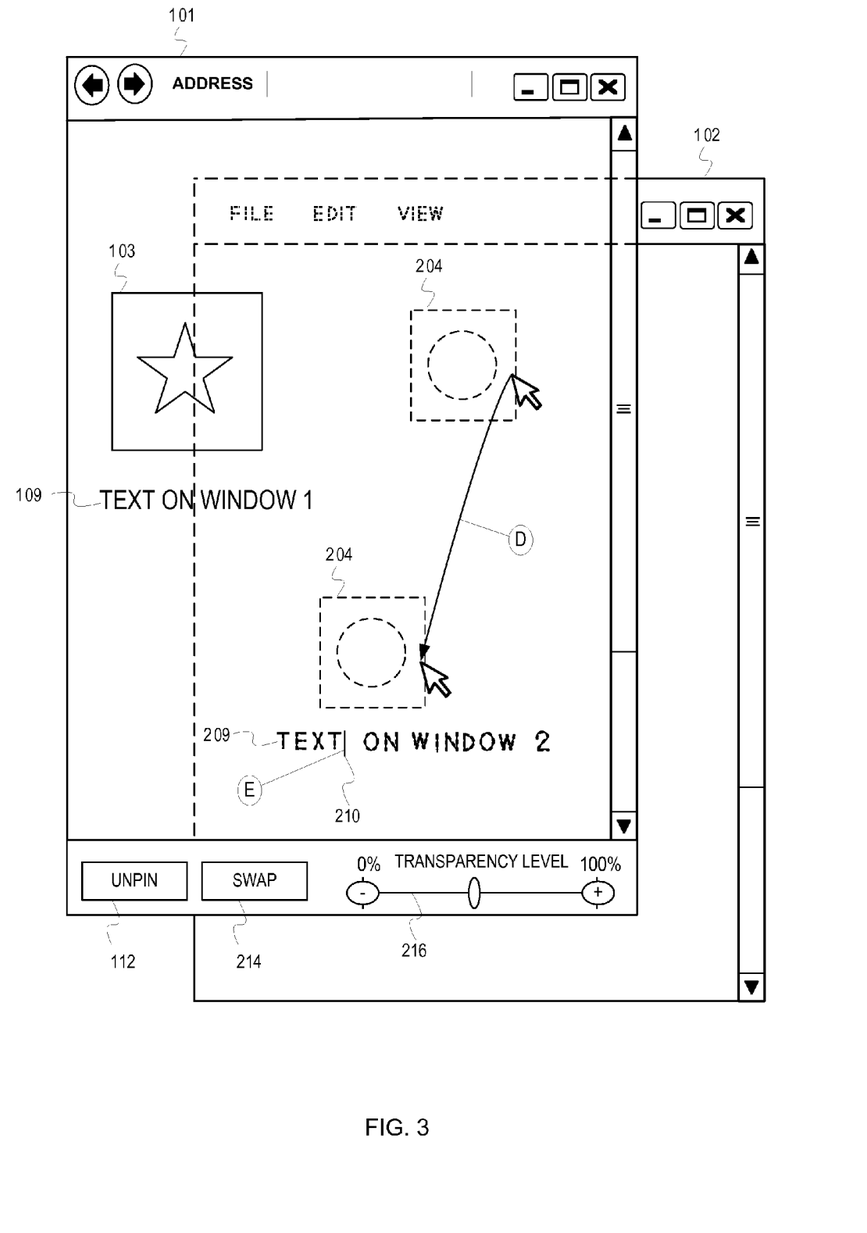

FIGS. 1-3 are example conceptual diagrams of controlling interactions via a transparent overlaid window. In FIG. 1, at stage "A," a first window 101 is positioned over a second window 102 in a user interface (e.g., on a desktop of an operating system application). The first window 101 and second window 102 can be controlled by a same application or by different, independent applications. For example, the first window 101 can be associated with an instance of a browser application and the second window 102 can be associated with an instance of a word processing application. The first window 101 is above the second window 102 in relation to each other according to a perspective viewed via a display. For instance, when a user selects the first window 101, at stage "A," an operating system program causes the first window 101 to be an active window, which appears to rise above all other windows in layering order. Specifically, the operating system assigns the first window 101 a first layering order value that is greater than a second layering order value for the second window. A focus for user input is assigned to the first window 101 when it becomes the active window. In other words, any objects presented in the first window 101, such as a first graphical object 103, first text 109, controls, etc. are prepared to receive input via user interaction with the objects in the first window 101 (e.g., prepared to respond to mouse selections, keyboard commands, etc.). A portion of the second window 102 that is behind the first window 101 is obscured by the presentation of the first window 101 being in front of the second window 102 because the first window 101 has a higher window layering order.

The first window 101 includes a control 112 that can be activated, as shown at stage "B," where a mouse pointer is positioned above the control 112 and a mouse button is clicked. When the control 112 is activated, the first window 101 is affixed, or pinned above the second window 102. In other words, the activation of the control 112 affixes the layering order of the first window 101 to maintain a layering order above that of the second window 102 so that even if a user selects (e.g., clicks on) the second window 102, the first window 101 remains on top of the second window 102.

The activation of the control 112 further initiates a transparency function that causes one or more parts of the first window 101 to have some degree of transparency (e.g., transparent or partially transparent) so that at least a portion of the second window 102 can be seen through the first window 101, as illustrated in FIG. 2. In FIG. 2, after the control 112 is activated, the control 112 changes appearance to indicate an "unpin" feature that can unpin the first window 101 so that if the second window 102 were to be selected by user input (e.g., by clicking on the second window 102) the window layering order for the second window 102 could exceed that of the first window 101. A second control 214 also appears that, if activated, can swap the position of window layering order of the first window 101 to be subject to, or below, the second window 102, and the second window 102 would then become partially transparent so that a portion of the first window 101 could be seen below the second window 102. The activation of the control 112, at stage "B," also causes a third control 216 to appear that can be used to modify a degree of transparency of the first window 101. For instance, the third control 216 can be a slider control that modifies the transparency of the first window between completely transparent (i.e., 100% transparent) to completely opaque, or non-transparent (0% transparent). On the second window 102, a second graphical object 204 and second text 209 can be seen through the one or more parts of the first window 101 that are transparent.

At stage "C," in FIG. 2, a user action with the first window 101, with a keyboard, a mouse, or some other input, can transfer the focus for subsequent user input from the first window 101 to the second window 102 while the first window 101 remains affixed, in window layering order, above that of the second window 102. For example, at stage "C," in response to a user positioning a mouse pointer 211, and the user clicking and holding down a mouse button for a given period of time (e.g., for 2 seconds), a focus for the user input focus is transferred from the first window 101 to the second window 102, as described in FIG. 3.

FIG. 3 illustrates some examples of user interactions and commands with content on the second window 102 occur after the focus of user input is transferred to the second window 102. For example, at stage "D," a user clicks and drags the second graphical object 204 from one location on the second window 102 to a second location on the second window 102 while the first window 101 remains affixed above the second window 102. Further, a text cursor 210 appears on the second window 102 and disappears from the first window 101 as the focus of the user input transfers to the second window 102. A user, at stage "E," types via a keyboard, which typing modifies, adds and/or deletes textual characters, numbers, and other symbols from the second text 209 on the second window 102. In other examples, a user can activate control objects on the second window 102, by clicking on the control object through the first window 101. When the control objects are activated, commands are initiated for the second window 102 (e.g., commands that change font type and/or styles, commands that modify a view of the second window 102, commands that insert one or more objects on the second window 102, etc.). Some controls of the second window 102, when activated, may launch a third window (e.g., to find a file or object to open or insert into the second window 102). The third window may appear momentarily above the layering order of the first window 101, or it may appear partially obscured by the first window 101.

Figure 4:
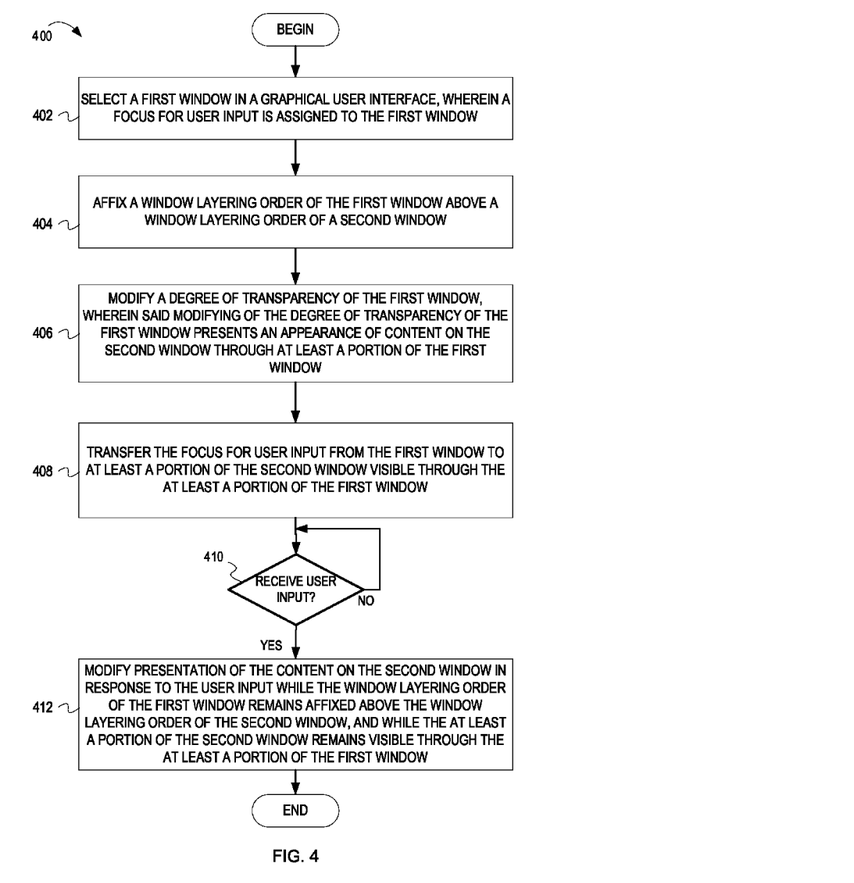
FIG. 4 is a flowchart depicting example operations for modifying transparency and controlling user input via overlaid windows.

FIG. 4 is a flowchart depicting example operations for modifying transparency and controlling user input via overlaid windows. For example purposes, operations associated with the blocks in FIG. 4 will be described as being performed by a windows control system ("system"), which may include any or all of the elements described in FIGS. 1-3 and/or FIGS. 5-8. FIG. 4 illustrates a flow 400 that the system can perform.

Referring to FIG. 4, the system selects a first window in a graphical user interface, wherein a focus for user input is assigned to the first window (402). For instance, the system can select a first window in response to a user-initiated command, via first user input associated with the first window, such as in response to a mouse-click on the first window. In other examples, the system selects the first window in response to a command that launches the first window via an operating system application (e.g., in response to a user launching an application executable, the system initiates an instance of the application and presents the first window on a foreground of a desktop presented via an operating system). The system causes a window layering order value for the first window to exceed that of any other windows displayed via a user interface so that a layering order of the first window is above the layering order of any other windows already presented. Thus, if the first window is beneath (e.g., partially obscured by) one or more other windows already presented on the user interface, the first window then rises in appearance above that of the other windows. Further, a focus for user input is assigned to the first window, or, in other words, the first window is made active. When the first window rises above any other window in layering order, the first window is prepared to receive and respond to one or more types of user input, such as key strokes, mouse clicks, etc. The other windows are not active, or in other words, a focus of the user input is subordinate to the first window because the other windows' layering orders are below that of the first window's layering order. The other windows that are below the first window may also be referred to as subordinate windows because their appearance and/or focus for user input is secondary to the first window in layering order and/or in focus for the user input.

Referring still to FIG. 4, the system affixes a layering order of the first window above a layering order of a second window (404). For example, the system can affix the layering order of the first window above the layering order of the second window, or any other subordinate window, in response to a user-initiated command (e.g., via clicking on a button, via pressing a key, via voice activation, etc. as similarly described in FIGS. 1-3 where the control 112 is activated). The system can ensure that the window layering order value for the first is always above that of one or more windows presented on the display. If the second window, which is below the first window, is selected or interacted with, the system can adjust a window layering order value for the first window to remain above that of the second window so that the first window appears to remain above the second window.

Referring still to FIG. 4, the system modifies a degree of transparency of the first window, wherein said modifying of the degree of transparency of the first window presents an appearance of content on the second window through at least a portion of the first window (406). The system can modify the degree of transparency in response to a user-initiated command, such as user interaction with a control associated with the first window (e.g., as described in FIG. 1-3, via interaction with the control 216). The user-initiated command can be the same user-initiated command that affixed the first window in the window layering order above the second window, or it can be a different user-initiated command. At least some portion of the first window has some degree of transparency. Content on the second window is visible through at least one transparent portion of the first window. The content on, and/or or any portion of, the second window can be partially obscured by partially transparent content on the first window. For example, in FIG. 2, the first object 103 overlaps a portion of the second window 102 and the portion of the second window 102 behind the first object 103 is partially obscured by the first object 103. Further, when a background of the first window 101 is partially transparent, so that the content on the second window 102 (e.g., the second object 204 and/or the second text 209) can be seen, the content on the second window 102 is partially obscured by the partially transparent background of the first window 101. In some embodiments, the background of the first window 101 can be entirely transparent (i.e., transparency value is 100% transparent), while a window border, window header, toolbars, etc. of the first window are non-transparent, or partially transparent.

Referring again to FIG. 4, the system can modify the degree of transparency of the first window automatically when a button is pressed on the first window. The pressing of the button can specify to both affix the window layering order of the first window above that of the second window and also cause the first window to have a specific degree of transparency according to a default setting (e.g., a default setting sets a first window transparency value to 50%). The user can set the default setting. In some embodiments, the system can swap or shift the layering position of the first window and the second window, which causes the second window to be affixed above the first window in layering order, such as via an "Alt-Tab" hotkey combination which causes the second window to be the top layer and the first window to be the lower layer in the windowing order (e.g., causes the first window to be subordinate to the second window). The swap or shift of the layering position can cause an automatic swapping of window transparency values (e.g., the swap can cause the second window to take on the transparency that the first window was at prior to the shift because the second window is now above the first window in window layering order, and cause the first window to be non-opaque, which the second window was prior to the swap).

Still referring to FIG. 4, the system further transfers the focus for user input from the first window to the at least a portion of the second window visible through the at least a portion of the first window (408). The system can transfer the focus for the user input from the first window to the second window while the layering order of the first window remains affixed above the layering order of the second window. The focus for the user input can remain assigned to the second window until an additional indication by the user to transfer the focus for the user input back to the first window. The system can transfer the focus for the user input from the first window to the second window in response to detecting an indication by the user. For example, the system can transfer the focus for the user input from the first window to the second window in response to hot-key input, a mouse click, or other user interactions with input devices. For example, the system can detect selection of specific hotkeys on a keyboard (e.g., Control+Shift+"Q"), which transfers the focus for the user input to the second window. In another example, the system can detect a mouse click, as similarly described in FIG. 2 at stage "C." In some embodiments, a duration that a press-and-hold action, such as a mouse click-and-hold action, is held can indicate a degree of depth of windows to which the focus for the user input should be transferred. In other words, a value indicated by the press-and-hold action indicates a position of the second window in an order of layering in a layered stack of overlaid windows. For example, a hold of the mouse click for two seconds can transfer the focus to the second window if the second window is second in the order of layering. If a third window is below the second window, a hold of the mouse click for three seconds can transfer the focus to the third window. Thus, in some embodiments, a numerical value that corresponds to the amount of time that the press-and-hold action is held, such as an amount of time that a mouse button is pressed and held, can correspond directly, or proportionately, to the order of the window in the layered stack of windows. In some embodiments, a degree of transparency of the first window can determine how much time a press-and-hold action is required to be held before the system will transfer the focus for the input to the layers below. For instance, if the first window's transparency is 100%, then a user could click normally to transfer control to the second window without having to hold the mouse click for an extended time period. However, if the transparency is less than 100%, the time for holding the click can vary in proportion to the degree of the transparency of the first window. For instance, if the first window's transparency is 50%, then a user may need to hold the click for a full two seconds to transfer the focus for the user input to the second window. If, however, the transparency is 30%, then a user may need to hold the mouse click longer (e.g., for 3 seconds) to penetrate to the second level. On the other hand, if transparency is at 0%, then the system could refrain from transferring the focus for the user input regardless of how long the mouse click is held. In the case where a user specifies to transfer the focus for the user input via a hot-key combination instead of a mouse click, the system can require different hot-key combinations that correspond to a depth of the window to which the focus should be transferred (e.g., Control+Shift+"2" transfers the focus to a second window in ordering layer, Control+Shift+"3" transfers the focus a third window in ordering layer, etc.). In some embodiments, the system can present an indicator to indicate that the focus was transferred (e.g., the second window blinks when the focus is transferred to the second window). In some embodiments, focus can be transferred back to the first window by a reversal indication (e.g., Control+Shift+"1" or a mouse click held for one second transfers the focus back to the first window).

Still referring to FIG. 4, the system further detects whether user input is received (410) and, if user input is received, the system modifies presentation of the content on the second window in response to the user input while the window layering order of the first window remains affixed above the window layering order of the second window and while the at least a portion of the second window remains visible through the at least a portion of the first window (412). For example, as in FIGS. 1-3, the second object 204 is moved at stage "D" and/or the second text 209 is modified at stage "E."

Figure 5:
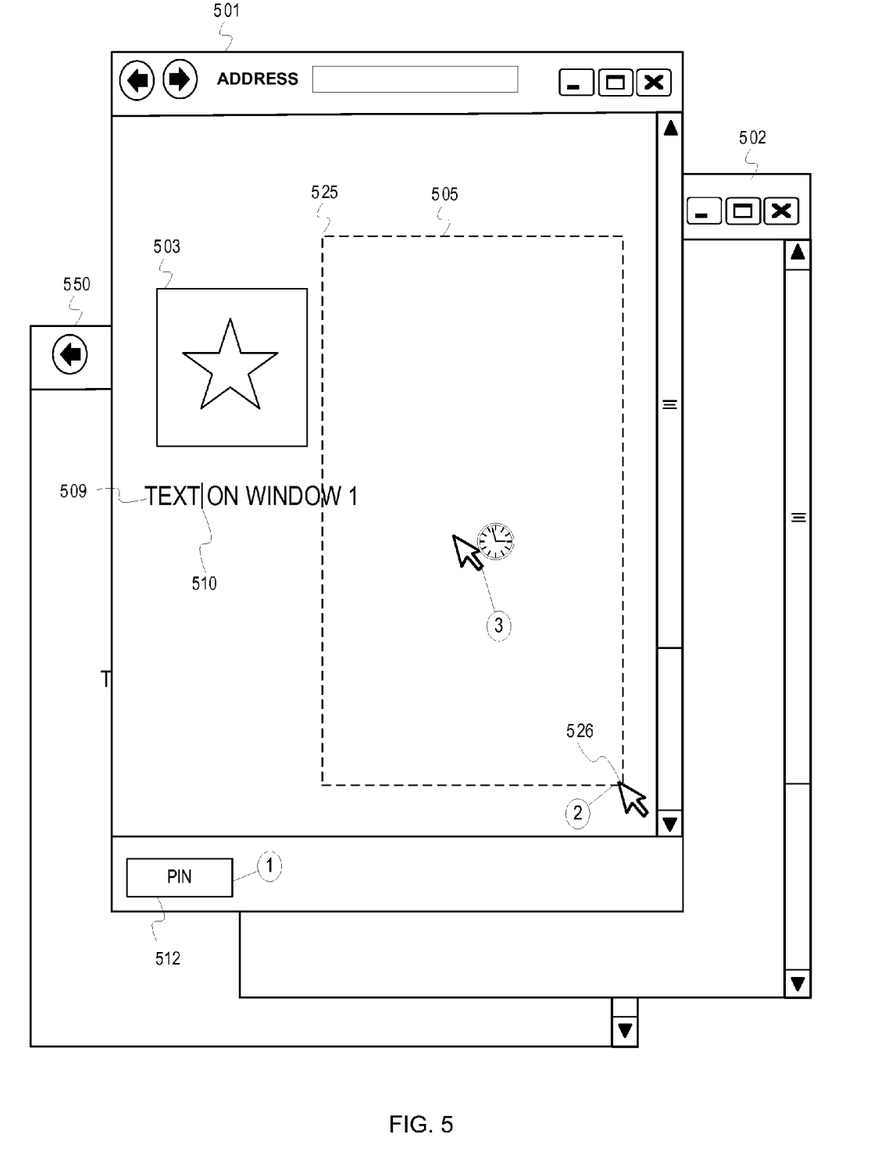
FIGS. 5-7 are example conceptual diagrams of controlling interactions via multiple transparent portions of overlaid windows.
Figure 6:
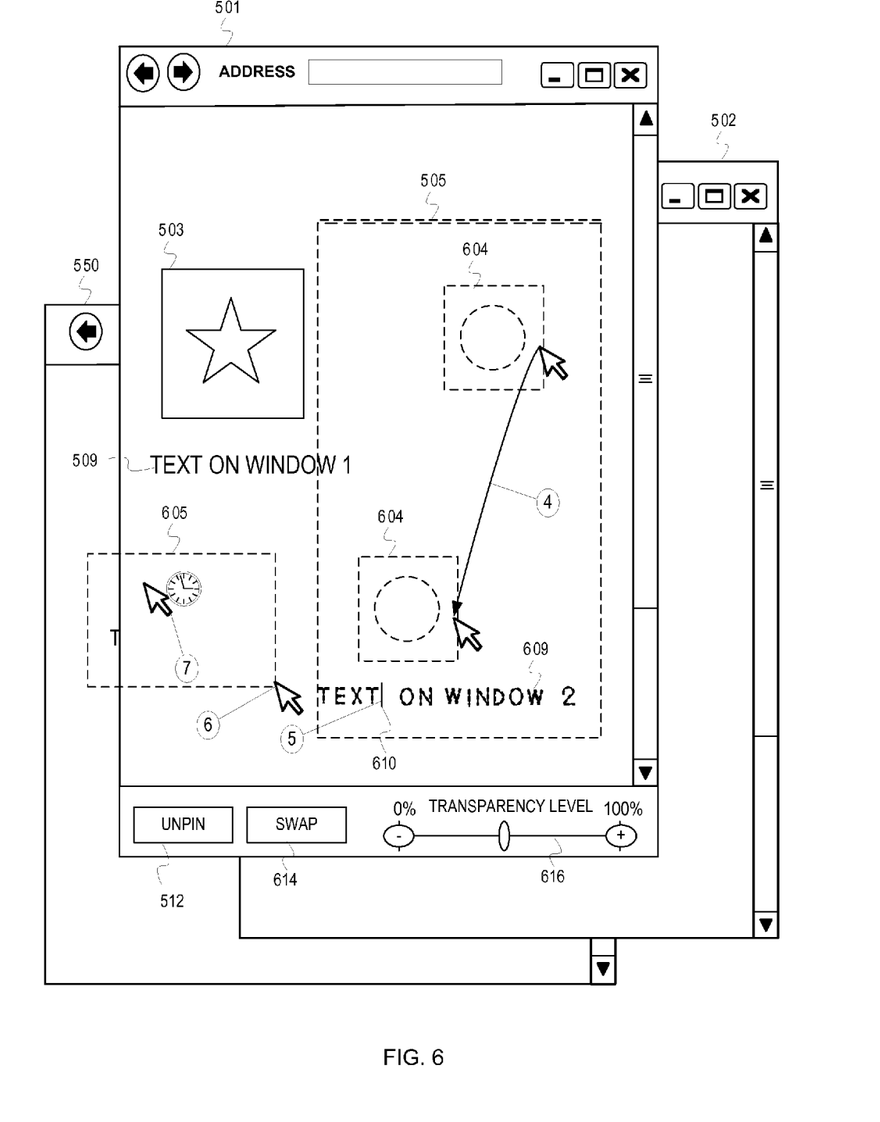
Figure 7:
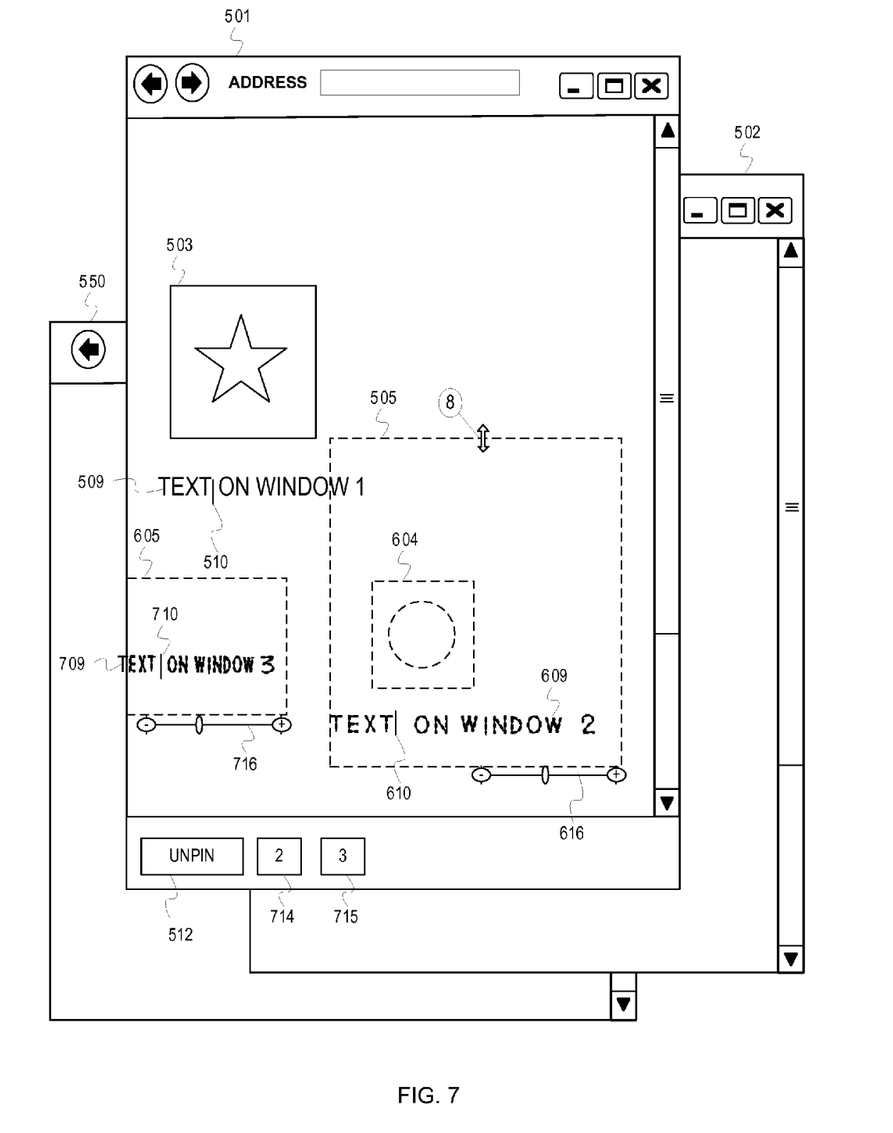

Referring still to FIG. 4, the system can specify only a portion of the first window to be transparent. For instance, the system can detect an indication of selective portions of the first window, such as by click-and-drag of the mouse, in which to modify the degree of transparency and/or or in which to transfer the focus for user input. FIGS. 5-7 are example conceptual diagrams of controlling interactions via multiple transparent portions of overlaid windows. For instance, FIGS. 5-7 illustrate an example of selecting one or more portions of a first window 501 and making only the one or more selected portions of the first window 501 transparent. For example, in FIG. 5, the first window 501 is overlaid onto a second window 502 and a third window 550. The first window 502 obscures a portion of the second window 502 and the third window 550. The second window 502 is also overlaid onto the third window 550. A first object 503 and first text 509 are on the first window 501. Focus for user input is assigned initially to the first window 501. For example, a cursor 510 appears within the first text 509. The cursor 510 indicates that the first text 509 can be modified in response to user input via a keyboard. At stage "1," the system can detect when a button 512 is clicked, which affixes the first window 501 above the second window 502 and the third window 550. At state "2," a mouse is clicked, held and moved from a first point 525 on the first window 501 to a second point 526 on the first window 501, causing and a mouse pointer to be dragged over an area 505 of the first window 501. The click-and-drag action can be accompanied, or preceded, by another command that indicates that the click-and-drag is being performed specifically for the purposes of making that area 505 transparent (e.g., the click-and-drag action is performed in combination with a hot-key combination). In some embodiments, the area 505 can be selected in response to clicking on a region of the first window 501 without dragging the mouse pointer. For example, a user could click a hotkey that temporarily displays a view of the content on the second window 502 and creates highlights of different regions of content on the second window 502 that the user can click on. For instance, after pressing the hotkey, the mouse pointer acts like a flashlight that penetrates through the first window 501 and displays content on the second window 502 through the first window 501. The user can move the mouse pointer around on the first window 501 until the user sees a portion of the second window 502 that the user wants to make visible through the first window 501, such as the area 505. The user then clicks a mouse button to indicate that the area 505 is to be selected. In other embodiments, the area 505 can be selected in response to voice commands, via a touch screen, or in other ways.

After the area 505 is selected, at stage "3," the system detects an additional action, such as a mouse click-and-hold action that is held for a specified period of time, or a hot-key combination. In response, the system modifies only the area 505 to have some degree of transparency, as shown in FIG. 6. For instance, the system can select pixel coordinate values for a portion of a display that corresponds to area 505. Content on each of the first window 501 and the second window 502 may have different display characteristics (e.g. different color values, contrast values, etc.). The system can modify the display characteristics for the pixels within the area 505 to appear to present content on the second window 502 that is within the portion of the second window 502 that corresponds to the area 505. If the transparency value is less than 100% transparent for the portion of first window 501 that corresponds to area 505, the system can modify the display characteristics for the pixels within the area 505 to simultaneously present a blended view of the content of the first window within the area 505 and the content on the second window within the area 505.

In FIG. 6, after the area 505 becomes at least partially transparent, a portion of the second window 502 is visible through the area 505. The second window 502 includes a second object 604 and second text 609 which are now visible through the area 505. The first window 501 can further modify the button 512 so that, if pressed, an "unpin" function would un-affix the first window 501 from being first in window layer order. The first window 501 also can present a swap button 614 and a transparency control 616, as similarly described previously. Further, concurrently with the area 505 becoming at least partially transparent, or in response to a subsequent action (e.g., in response to a click-and-hold action) the focus for user input is transferred to the portion of the second window 502 that appears in the area 505, while the first window 501 remains affixed above the second window 502, as similarly described in FIGS. 1-4. In some embodiments, focus for the user input may be transferred to only the portion of the second window 502 that is exposed via the area 505. At stage "4," a user can control the second object 604 and/or, at stage "5," type in the second text 609 (e.g., via a second cursor 610 that appears when the focus for user input is transferred to the second window 502). In some embodiments, the focus for user input may appear to be for both the first window 501 and the portion of the second window 502 exposed by the area 505. For example, if a user clicks on a portion of the first window 501 other than in the area 505, the system passes the focus for the user input to the first window 501. However, if the user clicks back on the area 505, the system automatically, and seamlessly, transfers the focus for user input back to the portion of the second window 502 exposed within the area 505. The transparency control 616 can modify the degree of the transparency of only the area 505.

In some embodiments, the system can select multiple areas to expose multiple areas of the second window 502. Each of the areas can have different buttons, sliders, or other controls that control the transparency for the areas individually. The multiple areas can also reach to a third, fourth, or other windows below the second window 502, such as the third window 550. Some areas can present portions of the multiple lower windows simultaneously so that multiple areas are seen through the first window 501 and focus for user input is transferred seamlessly between each of the multiple windows. For example, at stage "6," a user highlights the second area 605 and, at stage "7," the user clicks and holds a mouse pointer over the area 605 for a period of time that corresponds to a layering order for the third window 550. The click-and-hold action over the second area 605, for the period of time that corresponds to the layering order for the third window 550, penetrates through the first window 501 and the second window 502 to the third window 550, and makes portions of the first window 501 and the second window 502 that correspond to the second area 605 transparent to some degree. By making the portions of the first window 501 and the second window 502 that correspond to the second area 605 transparent to some degree, a portion of the third window 550 that corresponds to the second area 605 can be visible via the second area 605, as shown in FIG. 7. In FIG. 7, third text 709 on the third window 550 is visible through the first window 501 and through the second window 502. A focus for user input can further transfer to a portion of the third window 550 that corresponds to the second area 605. Further, in some embodiments, individual slider controls 616 and 716 are assigned to the areas 505 and 605. The controls 616 and 716 can be used independently to modify degrees of transparency for their respective areas 505 and 605. Further, additional controls 714 and 715 appear. If the control 714 is activated, the second window 502 can swap to be the highest ordered window, whereas if the control 715 is activated, the third window 550 can swap to be the highest ordered window. In some embodiments, the area 505 and/or 506 can be moved around on the first window 501, resized, scrolled, minimized or hidden, etc. exposing, respectively, different portions of the second window 502 and/or the third window 550. For example, at stage "8," the system detects when a mouse pointer is placed on an upper boundary of the area 505 and a mouse click-and-drag operation pulls the upper boundary downward, resizing the area 505 to be smaller than before. After being resized, the portion of the first window 501 that was previously part of the area 505 becomes non-transparent.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct an electronic device (e.g., computer, cell phone, television, set-top box, programmable data processing apparatus, etc.) to function in a particular manner, such that the instructions stored in the computer readable medium produce an article of manufacture including instructions which implement the function/act specified in the flowchart and/or block diagram block or blocks.

The computer program instructions may also be loaded onto an electronic device to cause a series of operational steps to be performed on the electronic device to produce a computer implemented process such that the instructions that execute on the electronic device provide processes for implementing the functions/acts specified in the flowchart and/or block diagram block or blocks.

Figure 8:
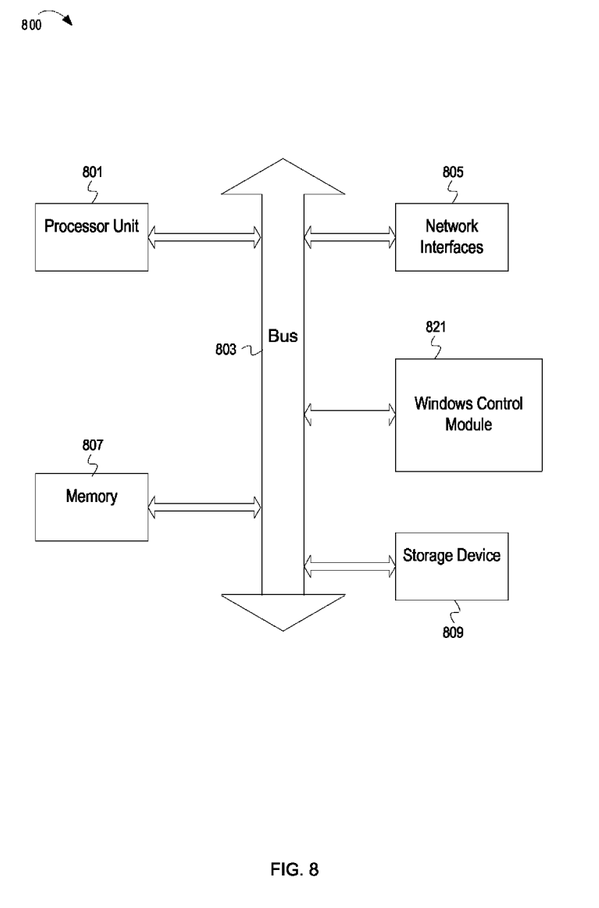
FIG. 8 depicts an example computer system.

FIG. 8 depicts an example computer system 800. The computer system 800 includes a processor unit 801 (possibly including multiple processors, multiple cores, multiple nodes, and/or implementing multi-threading, etc.). The computer system 800 includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable storage media or computer readable storage media. The computer system 800 also includes a bus 803 (e.g., PCI bus, ISA, PCI-Express bus, HyperTransport® bus, Infini-Band® bus, NuBus bus, etc.), a network interface 805 (e.g., an ATM interface, an Ethernet interface, a Frame Relay interface, SONET interface, wireless interface, etc.), and a storage device(s) 809 (e.g., optical storage, magnetic storage, etc.). The computer system 800 also includes a windows control module 821. The windows control module 821 can control windows and interactions with windows via a user interface, such as making windows transparent and controlling interactions with content via transparent windows. Any one of these functionalities may be partially (or entirely) implemented in hardware and/or on the processing unit 801. For example, the functionality may be implemented with an application specific integrated circuit, in logic implemented in the processing unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801, the storage device(s) 809, and the network interface 805 are coupled to the bus 803. Although illustrated as being coupled to the bus 803, the memory 807 may be coupled to the processor unit 801.

While the embodiments are described with reference to various implementations and exploitations, it will be understood that these embodiments are illustrative and that the scope of the inventive subject matter is not limited to them. In general, techniques for controlling interactions via overlaid windows as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   selecting a first window in a graphical user interface, wherein a focus for user input is assigned to the first window;

affixing a window layering order of the first window above a window layering order of a second window in a layered stack of overlaid windows within the graphical user interface;

detecting a first user input to draw a boundary of an area of the graphical user interface that corresponds to a portion of the first window;

determining that a press-and-hold user input is held in a pressed state for a specific period of time over the area of the graphical user interface that corresponds to the portion of the first window;

determining that a numerical value of the specific period of time corresponds proportionately to a numerical value of the window layering order of the second window in the layered stack of overlaid windows in response to the determining that the press-and-hold user input is held in the pressed state for the specific period of time;

modifying a degree of transparency of only the portion of the first window in response to the press-and-hold user input over the area of the graphical user interface for the specific period of time, wherein said modifying of the degree of transparency of the portion of the first window presents an appearance of content on at least a portion of the second window through the portion of the first window; and transferring the focus for user input from the first window to the at least the portion of the second window in response to the press-and-hold user input over the area of the graphical user interface for the specific period of time, wherein the at least the portion of the second window is visible through the portion of the first window while the window layering order of the first window remains affixed above the window layering order of the second window.

2. The method of claim 1, wherein the numerical value for the specific period of time that the press-and-hold user input must be held in the pressed state before the focus for the user input will transfer to the at least the portion of the second window further corresponds proportionately to a level of transparency of the first window prior to modifying the degree of transparency of the portion of the first window.

3. The method of claim 1, wherein the press-and-hold user input comprises one or more of a mouse click that is held down while a mouse pointer is directly over the area of the graphical user interface and a touch on a touch screen directly on the area of the graphical user interface.

4. The method of claim 1, wherein the numerical value of the specific period of time is a number of seconds that the press-and-hold user input is held in the pressed state, and wherein the number of seconds corresponds proportionately to a numerical depth of the second window in the layered stack of the overlaid windows.

5. The method of claim 1 further comprising:
detecting an additional user input associated with the boundary; and
resizing the boundary and the corresponding portion of the first window in response to the additional user input with the boundary.

6. The method of claim 5, wherein the additional user input comprises a click-and-drag operation of the boundary.

7. The method of claim 1 further comprising:
prior to determining that the press-and-hold user input is held in the pressed state for the specific period of time over the area, detect that the press-and-hold user input is moved across one or more additional areas of the graphical user interface that are over the first window;

as the press-and-hold user input is moved across the one or more additional areas of the graphical user interface that are over the first window, cause one or more additional portions of the first window that correspond to the one or more additional areas to change from a non-transparent state to a transparent state while the press-and-hold input is over the one or more additional areas; and cause the one or more additional portions of the first window to return to the non-transparent state when the press-and-hold input moves away from the one or more additional areas.

8. A computer program product for presenting content via a graphical user interface, the computer program product comprising:

a non-transitory computer readable storage medium having computer readable program code embodied therewith, the computer readable program code comprising:

computer readable program code configured to,
select a first window in a graphical user interface, wherein a focus for user input is assigned to the first window, wherein a window layering order of a second window is below a window layering order of the first window in a layered stack of overlaid windows, wherein a window layering order of a third window is below the window layering order of the second window, and wherein a first portion of the first window is presented over a first portion of the second window and over at least a portion of the third window in the graphical user interface;

affix the window layering order of the first window above the window layering order of the second window and above the window layering order of the third window within the graphical user interface;

detecting a first user input to draw a boundary of an area of the graphical user interface that corresponds to the first portion of the first window;

determine that a second user input is held in a pressed state for a period of time over the area of the graphical user interface that corresponds to the first portion of the first window;

determine that a numerical value of the period of time corresponds proportionately to a numerical value of the window layering order of the third window in the layered stack of overlaid windows and a level of transparency of the first window;

in response to the second user input, modify a degree of transparency of the first portion the first window and modify a degree of transparency of the first portion of the second window, wherein said modifying of the degree of transparency of the first portion of the first window and the modifying of the degree of transparency of the first portion of the second window presents an appearance of content on the at least a portion of the third window through the first portion of the first window and through the first portion of the second window;

in response to the second user input, transfer the focus for user input from the first window to the at least a portion of the third window;

receive a third user input, wherein the third user input interacts with the content on the at least a portion of the third window as the window layering order of the first window remains affixed above the window layering order of the second window and above the window layering order of the third window; and modify presentation of the content on the at least a portion of the third window in response to the third user input as the at least a portion of the third window remains visible through the first portion of the first window and through the first portion of the second window.

9. The computer program product of claim 8, said computer readable program code being further configured to,
prevent modification of transparency of a second portion of the first window and prevent modification of transparency of a second portion of the second window while simultaneously modifying the degree of transparency of the first portion of the first window and the first portion of the second window.

10. The computer program product of claim 8, said computer readable program code configured to modify the degree of transparency of the first portion of the first window and modify the degree of transparency of the first portion of the second window in response to a hot-key command in addition to the second user input over the area.

11. An apparatus comprising:
a processing unit; and
a windows control module configured to
detect a first user input to draw a boundary of a first area of a graphical user interface that corresponds to a first portion of a first window,
select the first area of a graphical user interface that is over the first portion of the first window, wherein a focus for user input is assigned to the first window, and wherein the first portion of the first window is presented over a first portion of a second window in the graphical user interface, wherein the first window and the second window are from a plurality of windows that are overlaid on the graphical user interface,
affix a window layering order of the first window above a window layering order of the second window within the graphical user interface,
modify a degree of transparency of the first portion of the first window, and not modify a degree of transparency of the rest of the first window, in response to selection of the first area of the graphical user interface, wherein said modifying of the degree of transparency of the first portion of the first window presents an appearance of first content on the first portion of the second window through the first portion of the first window,
transfer the focus for user input from the first window to the first portion of the second window visible through the first portion of the first window while the window layering order of the first window remains affixed above the window layering order of the second window and while the first portion of the second window remains visible through the first portion of the first window,
in response to a user request to swap the window layering of the first window and the second window, swap the window layering order of the second window to be above the window layering order of the first window, and
in response to the swap of the window layering of the second window to be above the window layering order of the first window, assign the degree of transparency of the first portion of the first window to the first portion of the second window for the first area of the graphical user interface and not assign the degree of transparency of the first portion of the first window to the rest of the second window, wherein the assignment of the degree of transparency of the first portion of the first window to the first portion of the second window presents an appearance of second content on the first window through the first portion of the second window.

12. The apparatus of claim 11, said windows control module being further configured to,
detect a selection of a second area of the graphical user interface over a second portion of the second window,
detect an input command that identifies a third window from the plurality of windows that are overlaid on the graphical user interface, wherein a window layering order of the third window is below the window layering order of the first window and below the window layering order of the second window,
modify a degree of transparency of the second portion of the second window that corresponds to the second area,
modify a degree of transparency of a second portion of the first window below the second portion of the second window, and
present an appearance of third content on at least a portion of the third window through the second portion of the second window and through the second portion of the first window while the second content on the first portion of the first window simultaneously appears visible through the first portion of the second window.

13. The apparatus of claim 12, wherein the input command comprises a press-and-hold user input that is held in a pressed state for a specific period of time over the second area of the graphical user interface, and said windows control module being further configured to,
detect that the press-and-hold user input is held in the pressed state for an amount of time over the second area of the graphical user interface, wherein a numerical value for the amount of time corresponds proportionately to at least one of the window layering order of the third window and a level of transparency of the second window, and
transfer the focus for the user input to the at least the portion of the third window in response to determining that the numerical value corresponds proportionately to the at least one of the window layering order of the third window and the level of transparency of the second window.

\* \* \* \* \*